US011611126B2

(12) United States Patent
Dittmann et al.

(10) Patent No.: US 11,611,126 B2
(45) Date of Patent: Mar. 21, 2023

(54) CONTAINMENT APPARATUS FOR BATTERY CELLS

(71) Applicant: BORGWARNER AKASOL GMBH, Darmstadt (DE)

(72) Inventors: Jorg Dittmann, Darmstadt (DE); Stephen Raiser, Darmstadt (DE)

(73) Assignee: BORGWARNER AKASOL GMBH, Darmstadt (DE)

( * ) Notice: Subject to any disclaimer, the term of this patent is extended or adjusted under 35 U.S.C. 154(b) by 0 days.

(21) Appl. No.: 17/049,936

(22) PCT Filed: Apr. 25, 2018

(86) PCT No.: PCT/EP2018/060604
§ 371 (c)(1),
(2) Date: Oct. 22, 2020

(87) PCT Pub. No.: WO2019/206409
PCT Pub. Date: Oct. 31, 2019

(65) Prior Publication Data
US 2021/0273283 A1  Sep. 2, 2021

(51) Int. Cl.
*H01M 50/213* (2021.01)
*H01M 10/613* (2014.01)
*H01M 10/643* (2014.01)
*H01M 10/653* (2014.01)
*H01M 10/6556* (2014.01)
(Continued)

(52) U.S. Cl.
CPC ....... *H01M 50/213* (2021.01); *H01M 10/613* (2015.04); *H01M 10/643* (2015.04); *H01M 10/653* (2015.04); *H01M 10/6556* (2015.04); *H01M 50/512* (2021.01); *H01M 50/519* (2021.01); *H01M 2220/20* (2013.01)

(58) Field of Classification Search
CPC ............ H01M 50/213; H01M 50/519; H01M 50/512; H01M 10/613; H01M 10/643; H01M 10/653; H01M 10/6556; H01M 10/519; H01M 10/512
See application file for complete search history.

(56) References Cited

U.S. PATENT DOCUMENTS

2011/0206948 A1* 8/2011 Asai ................. H01M 10/6554
429/7
2016/0093930 A1* 3/2016 Biskup ............... H01M 10/625
429/120
2016/0336563 A1* 11/2016 Choi ................. H01M 10/6551

FOREIGN PATENT DOCUMENTS

WO  WO-2017122438 A1 *  7/2017  .......... H01M 10/613
WO     2018071825 A2     4/2018

OTHER PUBLICATIONS

Nakamura T, WO-2017122438-A1, Published on Jul. 20, 2017, Translated on May 19, 2022 (Year: 2017).*

* cited by examiner

Primary Examiner — Jimmy Vo
(74) Attorney, Agent, or Firm — Vivacqua Crane, PLLC

(57) ABSTRACT

The present invention relates to a battery unit comprising one or more pairs of oppositely disposed receptacles, each said pair of receptacles defining a respective chamber for accommodating one or more cylindrical battery cells, each cylindrical battery cell having a first end adjacent a first end wall of a first one of said receptacles and a second end adjacent a second end wall of a second one of the pair of said receptacles. The invention further relates to a battery module comprising one or more battery units and to a battery system comprising a plurality of battery modules.

13 Claims, 4 Drawing Sheets

(51) Int. Cl.
*H01M 50/519* (2021.01)
*H01M 50/512* (2021.01)

CONTAINMENT APPARATUS FOR BATTERY CELLS

CROSS REFERENCE TO RELATED APPLICATIONS

This application is a national stage application under 35 U.S.C. 371 of PCT Application No. PCT/EP2018/060604 having an international filing date of 25 Apr. 2018, the entire disclosure of which is hereby incorporated herein by reference.

BACKGROUND OF THE INVENTION

The present invention relates to a battery unit comprising one or more pairs of oppositely disposed receptacles, each said pair of receptacles defining a respective chamber for accommodating one or more cylindrical battery cells, each cylindrical battery cell having a first end adjacent a first end wall of a first one of said receptacles and a second end adjacent a second end wall of a second one of the pair of said receptacles. The invention further relates to a battery module comprising one or more such battery units and to a battery system comprising a plurality of such battery modules.

BRIEF SUMMARY OF THE INVENTION

Electric vehicle batteries are typically cooled and/or heated in order to maintain ideal operating conditions for the battery regardless of the environment in which the electric vehicle is currently being operated. In this respect battery modules composed of a plurality of individual battery cells are known, with groups of battery modules respectively being arranged in a battery module housing to provide the electric vehicle with the desired power for a predetermined period of time.

In this connection it is known to use battery cells formed of prismatic cells that can be arranged in a battery module that is subsequently placed onto a cooling plate for cooling the prismatic cells.

Also the use of so-called pouch cell modules is known which have a relatively large planar surface area that is cooled via heat conducting plates at the edges of the battery cells, more specifically in the region of the tabs of the battery cells or even over the complete planar surface area.

Alternatively the use of cylindrical battery cell cells is also known for the formation of battery modules. Both of the ends of the respective battery cells are connected to other battery cells to form a respective positive or negative battery terminal. The cooling of such cylindrical battery cell cells can be brought about using different cooling techniques.

For example, the company TESLA Inc. cools the individual battery cells by placing these directly adjacent to a cooling plate that meanders past the cylindrical jacket surface of the cylindrical battery cell cells. In a different cooling design, e.g. employed by the company Kreisel Electric GmbH & Co KG, the cylindrical battery cell cells are immersed into a cooling fluid.

Cylindrical cells are well known for their comparatively high energy density. In comparison to other commercially available cell form factors (e.g. the aforementioned pouch cells or prismatic cells) cylindrical cells typically have an energy density that is about 20% higher than the other cell form factors. This is mainly due to the fact that the cell size is relatively small and therefore the hazardous chemical content per cell is small, so that chemicals having a higher chemical reactivity are traditionally placed in small cylindrical cells rather than in the large prismatic cells or pouch cells.

Cylindrical cells are also known for their very low cost per unit of energy. This is due to the simple and highly standardized manufacturing process along with the high specific energy content. A single wound active material (anode, cathode, separator) bobbin can be placed in a small metal container, no stacking or folding of multiple electrode layers is required in contrast to pouch or prismatic cells.

Despite these advantages, cylindrical cells are currently being used by very few automotive OEMs. This is due to the fact that hundreds to thousands of cells need to be bundled into a large battery system in order to provide the required power and energy. Moreover, in order to operate the battery at ideal operating conditions, the battery cells have to be regulated with respect to their temperature and due to the cylindrical shape thereof this is demanding in effort and cost, as well as not always being possible.

For this reason it is an object of the present invention to make available a cost effective battery unit respectively a battery module for an electric vehicle that can be cooled in an efficient manner, that is of modular design and that can be assembled in a simple and cost effective manner.

This object is satisfied by a battery unit, a battery module and by a battery system in accordance with the independent claim of the respective category. Preferred designs of the invention are specified in the dependent claims and the subsequent detailed description of embodiments.

Such a battery unit comprises one or more pairs of oppositely disposed receptacles, each said pair of receptacles defining a respective chamber for accommodating one or more cylindrical battery cells, each cylindrical battery cell having a first end adjacent a first end wall of a first one of said receptacles and a second end adjacent a second end wall of a second one of the pair of said receptacles, each cylindrical battery cell having positive and negative electrodes, with positive and negative bond wires being connected to said positive and negative electrodes at the first end of each battery cell and extending through apertures provided at said first end wall, said second end wall forming a thermal conduction path for dissipating heat.

The cylindrical cells are thus electrically connected only at one end thereof at one side of the battery unit, with the cooling taking place at the opposite end.

The battery cells can be connected at one end to an electronic circuit board arranged adjacent to the positive and negative electrodes in order to maintain short distances between the electrodes and the circuit board.

The wires can be attached to at least one of the electrodes and the electronic circuit board by methods such as wire bonding, welding, laser welding or soldering, press contacting or soldering.

In this way only one PCB is required per battery unit that can be connected to only one end of the batteries with the PCB in this way providing both: main current transfer from the batteries via the PCB to main battery terminals, as well as being able to provide electronic functions (V/I/T monitoring and cell SOC balancing) typically associated with a battery management system.

Preferably each said pair of receptacles defines a chamber for accommodating a plurality of cylindrical battery cell cells electrically connected together in parallel in a group. This design in connection with the appropriately designed PCB having an interwoven or two layer conductor layout can provide the desired battery cell parallel and serial connection by means of existing PCB or bus bar technology.

Advantageously a plurality of pairs of receptacles is provided each defining a chamber for accommodating a plurality of cylindrical battery cells electrically connected together in parallel in a respective group and respective groups being connected together in series or in parallel, with wall members of the respective receptacles forming electrical insulation between the respective groups. This design in connection with the appropriately designed PCB having an interwoven or two layer conductor layout can provide the desired battery module configuration with both parallel and serial connection by means of existing PCB or bus bar technology.

It is preferred if each said chamber includes locating elements at at least one of said second walls to form an array of regularly spaced cylindrical battery cells, preferably wherein at least some of the locating elements have tapered wall elements forming introduction aids for inserting each of the cylindrical battery cells. The locating elements and if provided the tapered wall elements ensure a more facile assembly of the battery unit, while at the same time ensuring a mechanical and electrical separation between the individual battery cells.

Preferably the second end wall is formed of a material having a higher thermal conductivity than a material of the first end wall. In this way parts of the battery unit can be tailored towards cooling purposes and the remaining parts can be tailored towards electronic connectivity, for example.

Advantageously the second end wall is either integrally formed with said second receptacle, for example, of a plastic filled with an $Al_2O_3$ filler, or is at least partly formed separately, for example by means of a thermally conducting film bonded to the second receptacle, or by means of a thermally conducting wall bonded to the second receptacle. In this way a receptacle can be formed that is specifically tailored towards being thermally conductive yet electrically isolating. The first receptacle can in this connection be formed from an isolating material and be mated to a cell PCB style interwoven conductor structure for extrapolating the desired battery voltages and currents.

It is preferred if a plurality of pairs of receptacles are provided and wherein common wall elements of the plurality of pairs of receptacles are arranged/formed between directly adjacent groups of cylindrical battery cells, wherein the common wall elements form electrical insulation between the respective groups. In this way battery units with varying output voltages and output powers can be made available with the same number of battery cells. The output voltages and output powers made available depend on the application of the battery unit.

Preferably means is provided in at least one of each pair of receptacles for positioning each cylindrical battery cell in the respective chamber in a predetermined, in particular fixed, orientation, said means preferably being located at at least one of said first end wall and said second end wall and especially comprising a blob of adhesive forming an adhesive bond to each said cylindrical battery cell, wherein each means is most preferably provided as a blob of adhesive forming an adhesive bond to each said cylindrical battery cell; and/or is formed by apertures in at least one of the respective end walls which are at least partly filled with a blob of adhesive forming an adhesive bond to each said cylindrical battery cell.

In this way the cylindrical battery cells can each be glued into the receptacles preferably with a thermally conductive glue on the bottom side, and possibly with an electrically conductive glue at the opposite side.

Advantageously an end of the first one of each pair of receptacles remote from the first wall is spaced in an axial direction of the cylindrical battery cells from an end of the second one of each pair of receptacles remote from the second wall.

Optionally the second one of each pair of receptacles has a reduced height in comparison to the first one of the pair of receptacles and in a first limiting case comprises only the second end wall having apertures therein and in a second limiting case is replaced by open ends of the first one of the receptacles. In this way the amount of more costly material required for formation of the thermal conduction path present at the second receptacle can be reduced making the battery unit more cost effective in its manufacture.

It is preferred if the battery unit further comprises thermally conductive and flame retardant feature elements, with the thermally conductive and flame retardant feature elements being disposed at at least one of the receptacles of each pair of receptacles, and in particular forming at least a part of said receptacle. In this way, e.g. damage to further batteries or the electric vehicle can be avoided.

Preferably the positive and negative bond wires are connected to an electric circuit board provided at an outer side of the first end wall of the pairs of receptacles. This makes available the electronic contacts of the battery unit directly at one side of the battery unit in the form of a positive and negative voltage potential.

Advantageously the positive and negative voltage potentials (e.g. made available via the positive and negative bond wires) are connected to a battery management system, with the battery management system optionally being integrated in a printed circuit board configured to transport and distribute a current made available via the battery cells, and with the battery management system preferably being configured to monitor a voltage, a current and a temperature of at least one of an individual battery cell, some of the battery cells arranged in one chamber and all of battery cells arranged in one chamber and/or for the purpose of fusing and of power switching. The battery management system can thus make available all electronic functions (V/I/T monitoring and cell SOC balancing) typically associated with a battery management system on one circuit board at one side of the battery unit making the battery management system more accessible in use. Such battery management system features can be fully integrated in a main current carrying and distributing PCB, including but not limited to V/I/T monitoring, fusing and power switching.

It is preferred if a cooling plate is arranged at the second end wall of the chamber and forms a part of the thermal conduction path for dissipating heat from the second ends of the cylindrical battery cells, there optionally being a thermally conductive member interposed between said second ends and said cooling plate. By means of such a cooling plate the temperature of all batteries can be maintained to within a predetermined desired operating range, e.g. selected to be within 5° C. to 25° C. and preferably to within 15° C. to 20° C.

Preferably said cooling plate comprises one or more coolant passages that are configured to conduct a coolant therethrough, wherein each coolant passage is associated with one, or more rows of the cylindrical battery cells. In this way the cooling function of the cooling plate can be further enhanced by means of liquid cooling. This ensures a reduced temperature gradient between the batteries arranged within one battery unit in comparison to e.g. air cooled cooling plates.

According to a further aspect the present invention relates to battery module. Such a battery module comprises one or more battery units as discussed herein arranged at a base plate, a battery management system connected to the positive and negative bond wires of the cylindrical battery cells, and fastening means for connecting said one or more battery units to the base plate.

The advantages discussed in the foregoing in connection with the battery unit likewise hold true for the battery module in accordance with the invention.

Preferably two battery units are provided at a T-shaped carrier, said T-shaped carrier being formed by said base plate and said cooling plate, the cooling plate extending from the base plate at right angles thereto, with the two battery units being provided on opposite sides of said cooling plate with the respective second walls of each battery unit being positioned at respective faces of said central cooling plate, preferably wherein the battery management system is arranged at a further electric circuit board that extends at least substantially in parallel to the base plate between the respective circuit boards arranged at the first end walls of the two battery units and that is connected to said circuit boards arranged at the first end walls via conducting elements.

In this way a compact assembly of a battery module can be achieved through use of an inverted T shaped carrier, e.g. formed from aluminum, which accepts two cell assemblies and a top side PCB to form a battery module, which is based on cylindrical cells (e.g. 21700), but has matching interfaces and dimensions to a prismatic cell module (e.g. PHEV2).

Preferably the T shaped carrier can be formed from an extruded section, e.g. of aluminum. The extruded section can feature multiple extruded tube-like channels, which can be interconnected to form a liquid coolant plate of large size and hence a module with integrated coolant plate.

According to a further aspect the present invention relates to a battery system. Such a battery system comprises a plurality of battery modules as discussed herein, a cooling system connectable to each of the battery modules, a battery controller electrically connected to each of the battery management systems of the battery modules, and a housing in which said plurality of battery modules are arranged.

The advantages which were explained in connection with the various embodiments of the method in accordance with the invention are true in an analog manner for the adaptation of the cooling module in accordance with the invention as well as for the hollow section in accordance with the invention.

BRIEF DESCRIPTION OF THE SEVERAL VIEWS OF THE DRAWINGS

The invention will be described in detail in the following by means of embodiments with reference to the drawing, in which are shown.

DETAILED DESCRIPTION

Figure 1:
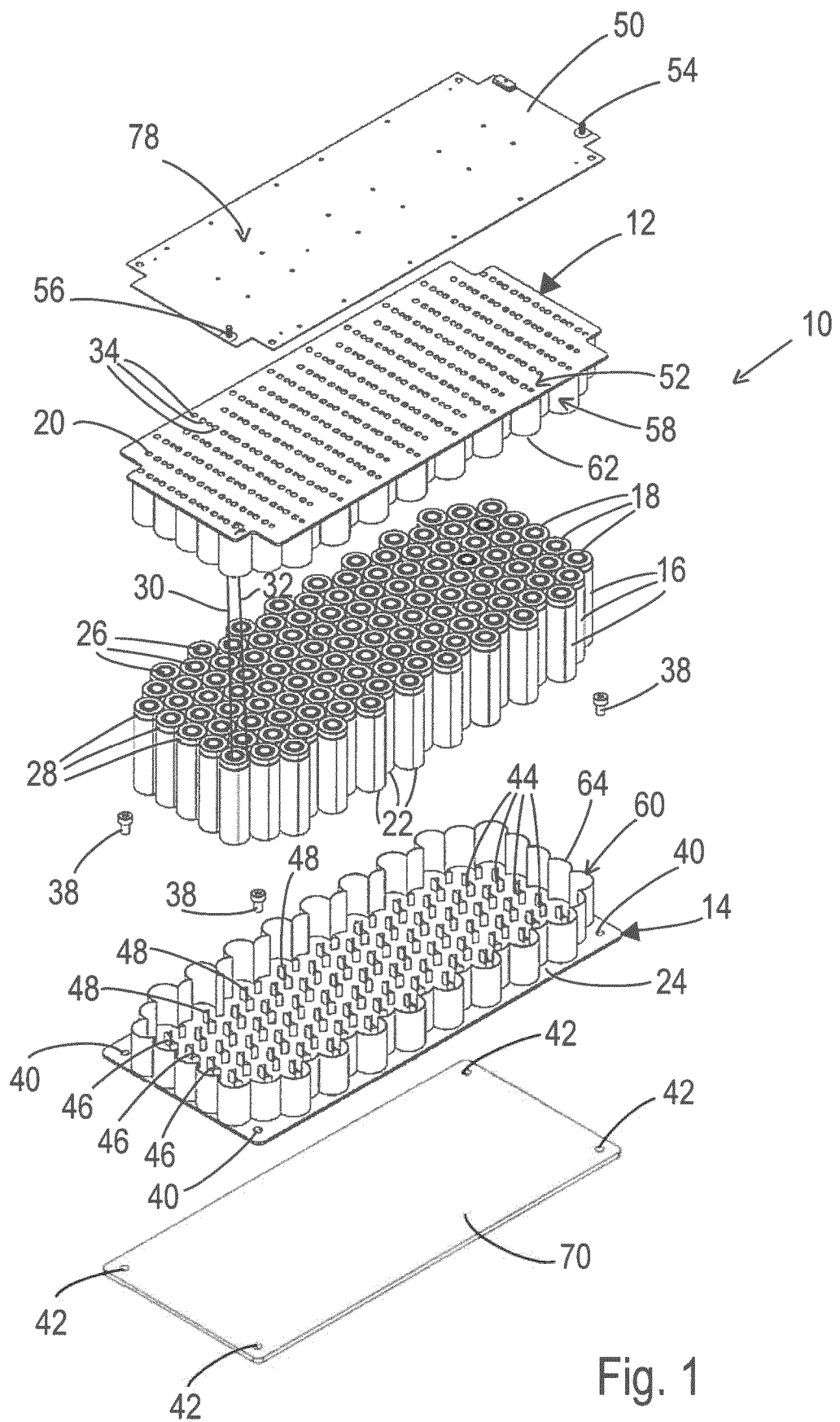
FIG. 1 a perspective exploded view of a low profile battery module.

Features having the same or a similar function will be provided with the same reference numeral in the following and it is naturally understood that the description which is provided for components or component functions in connection with an embodiment are also true for other embodiments in which the same reference numerals are used, unless something is said to the contrary.

FIG. 1 shows a perspective exploded view of a battery unit 10 comprising a pair of oppositely disposed first and second receptacles 12, 14, each said pair of receptacles defining a respective chamber for accommodating a plurality of cylindrical battery cells 16. Each cylindrical battery cell 16 has a first end 18 arranged adjacent to a first end wall 20 of said first receptacle 12 and a second end 22 arranged adjacent to a second end wall 24 of said second receptacle 14.

Each cylindrical battery cell 16 has positive and negative electrodes 26, 28 at the first end 18. Respective positive and negative bond wires 30, 32 are connected to said positive and negative electrodes 26 28 at the first end 18 of each cylindrical battery cell 16 following the assembly of the cylindrical battery cells 16 in the respective pairs of receptacles 12, 14. By way of example two such bond wires 30, 32 are indicated in FIG. 1. The bond wires are arranged to extend through apertures 34 provided at said first end wall 20.

The second end wall 24 forms a thermal conduction path for dissipating heat from the second ends 22 of the cylindrical battery cells 16 to a base plate 70. The base plate 70 is arranged directly adjacent to the second wall 24. It is possible that a heat conducting paste or a heat conducting layer (both not shown) is arranged between the base plate 70 and the second end wall 24. Moreover, the second end wall 24 can be formed of a material having a higher thermal conductivity than a material of the first end wall 22.

Moreover, the second end wall 22 can either be integrally formed with said second receptacle 14 (as shown in FIG. 1), for example, of a plastic filled with an $Al_2O_3$ filler.

Alternatively the second end wall 22 can at least partly be formed separately, for example, by means of a thermally conducting film bonded to the second receptacle 14, or by means of a thermally conducting wall bonded to the second receptacle 14.

Optionally a thermally conductive member (not shown) can be interposed between said second ends 22 and said base plate 70 in order to enhance the thermal conductivity between the second ends 22 and said base plate 70.

In FIG. 1 the fastener elements 38 are formed as bolts that pass through apertures 40 present in the second wall 24 and apertures 42 in the base plate 70 and engage a threaded member (not shown) present in an external cooling plate (not shown).

Locating elements 44 are arranged at the second wall 24, these form spacers between the cylindrical battery cells 16 and aid in forming an array of regularly spaced cylindrical battery cells 16.

The locating elements 44 can have tapered wall elements 46 forming introduction aids that aid in the insertion of each of the cylindrical battery cells 16 into the second receptacle 14 on assembly of the battery unit 10. The battery unit 10 can, for example, be manufactured in an automated process in which the cylindrical battery cells 16 are inserted from above into the chamber formed by the second receptacle 14 and are guided into their respective position within the locating elements 44 at the second wall 24 via the tapered wall elements 46.

Locating elements 44 and tapered wall elements 46 can not only be provided at said second wall 24, but can also be provided at said first wall 20. In this instance the locating elements 44 and the tapered wall elements 46 present at the first wall 20 can be of identical design to those present at the second wall 24, or also differ in their design.

Means for positioning each cylindrical battery cell 16 in the respective chamber of the first and second receptacles 12, 14 in a predetermined and, in particular fixed, orientation can also be provided.

Such means can, for example, comprise a metered amount of adhesive, such as a blob or drop of adhesive 48 that forms an adhesive bond to each said cylindrical battery cell 16.

The blobs of adhesive 48 that can be provided at the second end wall 24 can comprise a thermally conductive material in order to further enhance the thermal properties of the thermal conduction path.

In this connection each respective blob of adhesive 48 which forms an adhesive bond to each said cylindrical battery cell 16 is applied either at the locating element or at the respective first and second wall 12, 14 or is provided in the region of the apertures 34 which are then at least partly filled with the blob of adhesive 48 forming an adhesive bond to each said cylindrical battery cell 16.

The respective positive and negative bond wires 30, 32 that are guided through the apertures 34 are connected to an electric circuit board 50 provided at an outer side 52 of the first end wall 20 of the pairs of receptacles 12, 14. The electric circuit board likewise has apertures present in the region of the bond wires 30, 32 such that the bond wires can be electrically connected to the electric circuit board 50. In this connection it should be noted that the electric circuit board 50 is preferably directly arranged adjacent to the first end wall 20. Flame retardant features could be provided between the electric circuit board 50 and the first end wall 20.

In the embodiment shown in FIG. 1 the pair of receptacles 12, 14 defines a chamber for accommodating said plurality of cylindrical battery cells 16 that are electrically connected together in parallel in a group. This means that the output voltage of the battery unit 10 of FIG. 1 will be in the region of 2.7 to 4.2 V depending on the state of charge of the cylindrical battery cells 16. Due to the fact that 120 batteries are arranged in parallel to one another the maximum output current can be in the region of e.g. 100 to 500 A, i.e. the maximum output power can be in the region of 270 to 2100 W.

It should also be noted in this connection that the battery cells 16 shown in FIG. 1 could also be arranged in groups, with the respective battery cells 16 of the groups being connected to one another in parallel and the groups being connected to one another in series. For example, the 120 battery cells 16 shown in FIG. 1 could be connected to one another in 10 groups and thereby produce an output voltage of the battery unit 10 in the region of 28 to 38.5 V depending on the state of charge of the cylindrical battery cells 16. The battery cells 16 could also be connected to one another in a different number of groups to form battery units 10 having different output voltages. Battery cell housings from different cell parallel groups must be isolated to avoid short circuits.

By connecting several such pairs of receptacles 12, 14 to one another to form a battery unit 10, these can be connected to one another in series or in parallel in dependence on the case of application. Alternatively each battery unit 10 only comprises one pair of receptacles 12, 14 and a plurality of battery units 10 can be connected to one another, e.g. in series, so as to obtain a high voltage battery system (not shown).

A battery unit 10 with high output voltage can be achieved by providing a plurality of pairs of receptacles 12, 14 which each define a chamber for accommodating a plurality of cylindrical battery cells 16 electrically connected together in parallel in a respective group and the respective groups of pairs of receptacles 12, 14 can then be connected together in series. Alternatively the respective groups can be also be connected to one another in parallel to form said battery unit 10.

These electrical connections between battery units 10 can take place via the positive and negative terminals 54, 56 respectively provided at the electric circuit board 50.

In this connection it should be noted that wall members 58, 60 of the respective receptacles 12, 14 are formed from a material comprising electrical insulation. On arranging two or more battery units 10 or a plurality of pairs of receptacles 12, 14 next to one another, the wall members 58, 60 form electrical insulation between the respective pairs of receptacles 12, 14.

If a battery unit 10 is formed from a plurality of pairs of receptacles 12, 14 then the wall members 58, 60 are formed by common wall elements 58, 60 of the plurality of pairs of receptacles 12, 14. The wall elements 58, 60 are then arranged/formed between directly adjacent groups of cylindrical battery cells 16. The common wall elements 58, 60 then form electrical insulation between the respective groups. See FIG. 4 as a reference, where 6 such groups (each containing 12 battery cells) are shown.

In this connection it should be noted that the number of cylindrical battery cells 16 per group can vary and can be selected to comprise between 1 and e.g. up to 360 cylindrical battery cells 16. These are either connected to one another in series, in parallel or partly in series and partly in parallel, depending on the case of application of the battery unit 10.

It is also conceivable that thermally conductive and flame retardant feature elements (not shown) are provided at the battery unit 10. These can, for example be formed from a layered material that is disposed between at least one of the cooling plate 36 and the second wall 24, the second wall 24 and the respective battery cells 16, the respective battery cells 16 and the first wall 20, the first wall 20 and the electric circuit board 50 or be present in the region of the wall members 58, 60. It is also conceivable that the thermally conductive and flame retardant feature elements form at least a part of one of said receptacles 12, 14.

On assembly of the battery unit 10 of FIG. 1 it is further conceivable that a gap is formed between directly adjacent ends 62, 64 of the wall members 58, 60, such that the end 62 of the wall member 58 of the first receptacle 12 remote from the first wall 20 is spaced in an axial direction of the cylindrical battery cells 16 from the end 64 of the wall member 60 of the second receptacle 14 remote from the second wall 24.

It is also conceivable that the wall member 60 of the second receptacle 14 has a reduced height in comparison to the wall member 58 of the first receptacle 12.

In a first limiting case the second receptacle 14 can be formed from a block of material having apertures present therein into which the ends 22 of the cylindrical battery cells 16 are introduced and only the first receptacle 12 has wall members 58. In a second limiting case the second receptacle is replaced by open ends of the first one of the receptacles 12 and the second receptacle 14 essentially only comprising the second end wall 24 and the locating elements 44.

The positive and negative bond wires 30, 32 are connected to a circuit board 50. The battery management system 78 can be integrated into the circuit board 50. The circuit board 50 is configured to transport and distribute a current made available via the battery cells 16 to the positive and negative terminals 54, 56.

The battery management system 78 is preferably configured to monitor at least one of a voltage, a current and a temperature of at least one of an individual battery cell 16, some of the battery cells 16 arranged in one of the pairs of receptacles 12, 14 and all of battery cells 16 arranged in one pair of receptacles 12, 14. The battery management system 78 can further be configured for the purpose of fusing and of power switching or current sensing.

Figure 2:
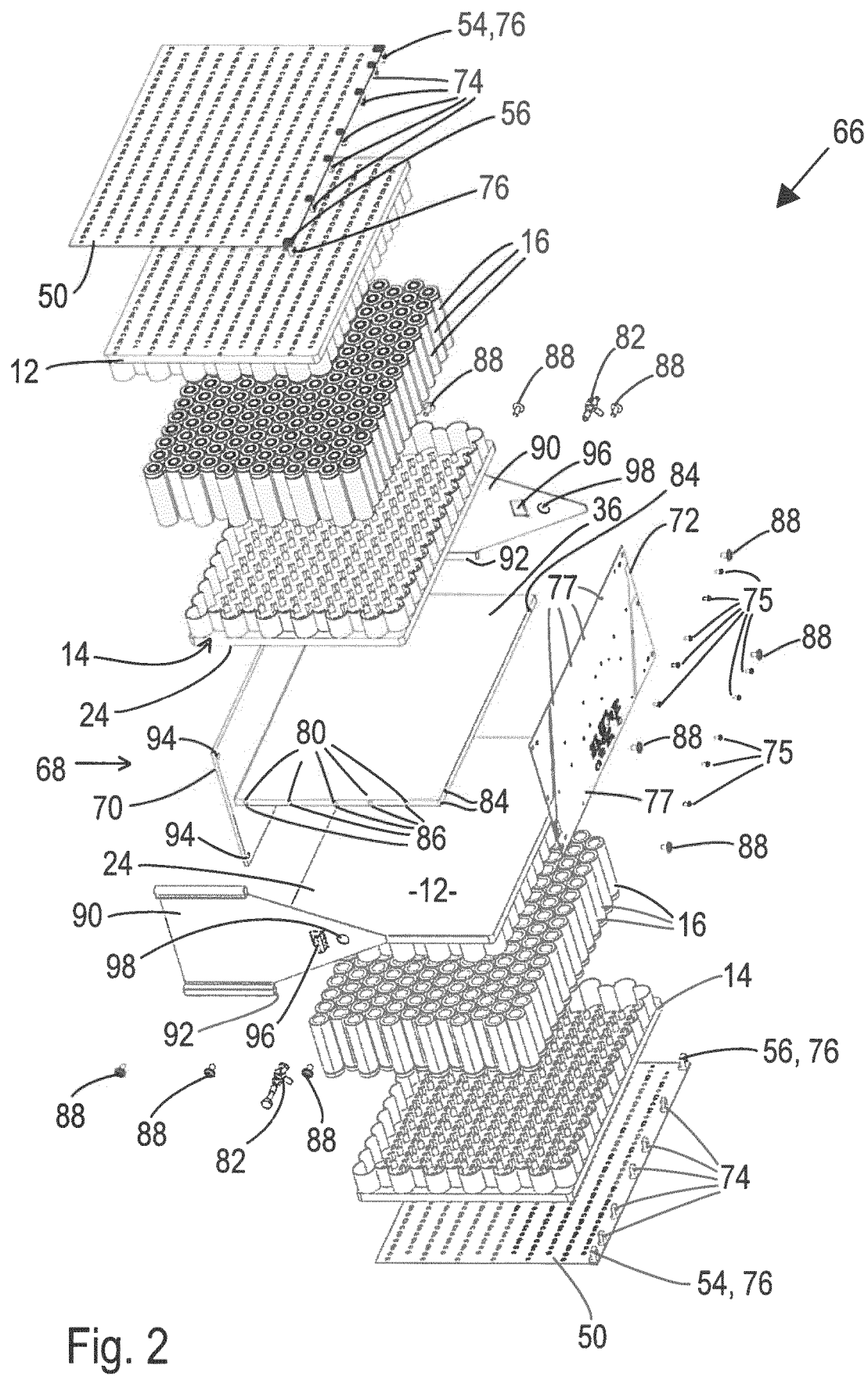
FIG. 2 a perspective exploded view of a battery module.

FIG. 2 shows a battery module 66 comprising two battery units 10. The two battery units are provided at a T-shaped carrier 68. The T-shaped carrier is formed by a base plate 70 and said cooling plate 36. The cooling plate 36 extends from the base plate 70 at right angles thereto.

The two battery units 10 are provided on opposite sides of said cooling plate 36, with the respective second walls 24 of each battery unit 10 being positioned directly adjacent to the cooling plate at respective faces of said sides of the centrally arranged cooling plate 36.

The battery module 66 further comprises a centrally arranged battery management system 78 that is arranged at a further electric circuit board 72. The further electric circuit board 72 extends at least substantially in parallel to the base plate 70 between the respective circuit boards 50 of the battery units 10. The respective circuit boards 50 of the battery units 10 are arranged at the first end walls 20 of the two battery units 10. The further electric circuit board 72 is connected to said circuit boards 50 arranged at the first end walls 20 via first and second conducting elements 74, 76.

In the example of FIG. 2, the battery management system 78 is not provided at the electric circuit boards 50, but is rather arranged at the further electric circuit board 72 and in this way one common battery management system 78 is made available for each battery unit 10 of a battery module 66.

The first conducting elements 74 are dimensioned smaller than the second conducting elements 76. The second conducting elements 76 are formed by the respective positive and negative terminals 54, 56 of the electronic circuit boards 50. In the example shown in FIG. 2, the two battery units 10 of the battery module 66 are connected to one another in series and the battery cells 16 of each battery unit 10 are connected to one another in parallel. The first and second conducting elements 74, 76 can be fastened to the further electric circuit board 72 by means of fastener elements 75 cooperating with the apertures 77 present at the further electric circuit board 72 and the first and second conducting elements 74, 76.

Due to the large amount of battery cells 16 present in each battery unit 10, e.g. 172 battery cells per battery unit 10, the cooling plate 36 comprises 5 coolant passages 80. The coolant passages 80 are configured to conduct a coolant though the cooling plate 36. Each coolant passage 80 is associated with two or more rows of the cylindrical battery cells 16. In this connection it should be noted that a coolant passage 80 could be provided per row of battery cells 16 present in the battery unit 10. It should further be noted that a coolant passage can also be associated with two, three, four or more rows of battery cells 16.

A liquid coolant (not shown) can be introduced into the cooling plate 36 from one end and be extracted again at the other end. In order to distribute the coolant into the cooling plate 36 coolant is introduced into the cooling plate 36 at one position via a spout 82. The cooling plate 36 comprises a transverse cooling passage 84 that interconnects the respective cooling passage 80 and that acts as a distributor for the coolant.

The second such transverse cooling passage 84 arranged at the other end of the cooling plate 36 acts as a collector for the coolant in order to collect and extract the coolant at the other end of the cooling plate 36 via a further spout 82.

The openings 86 of the respective cooling passages 80, 84 that are not connected to one of the spouts 82 are blocked off using a respective plug or bolt 88 that is inserted into the opening 86.

Stabilizing members 90 are also visible at opposite ends of the T-shaped carrier 68. The stabilizing members 90 one the one hand form stops that prevent the battery units 10 from sliding out of the T-shaped carrier 68, on the other hand the stabilizing members 90 also comprise passages 92, via which bolts (not shown) can be passed to connect the battery module 66, to a cooling member of a battery system (not shown) arranged beneath the base plate 70 of the T-shaped carrier 68. Such bolts can also pass through apertures 94 present at the base plate 70.

The stabilizing members 90 also comprise noses 96 via which the battery modules 66 can be handled on introduction into a housing of a battery system (both not shown). A cut-out 98 is also visible at the stabilizing member 90. The respective spout 82 projects from the cooling plate 36 through the cut-out 98 such that the liquid cooling can be connected to the spout 82.

Figure 3:
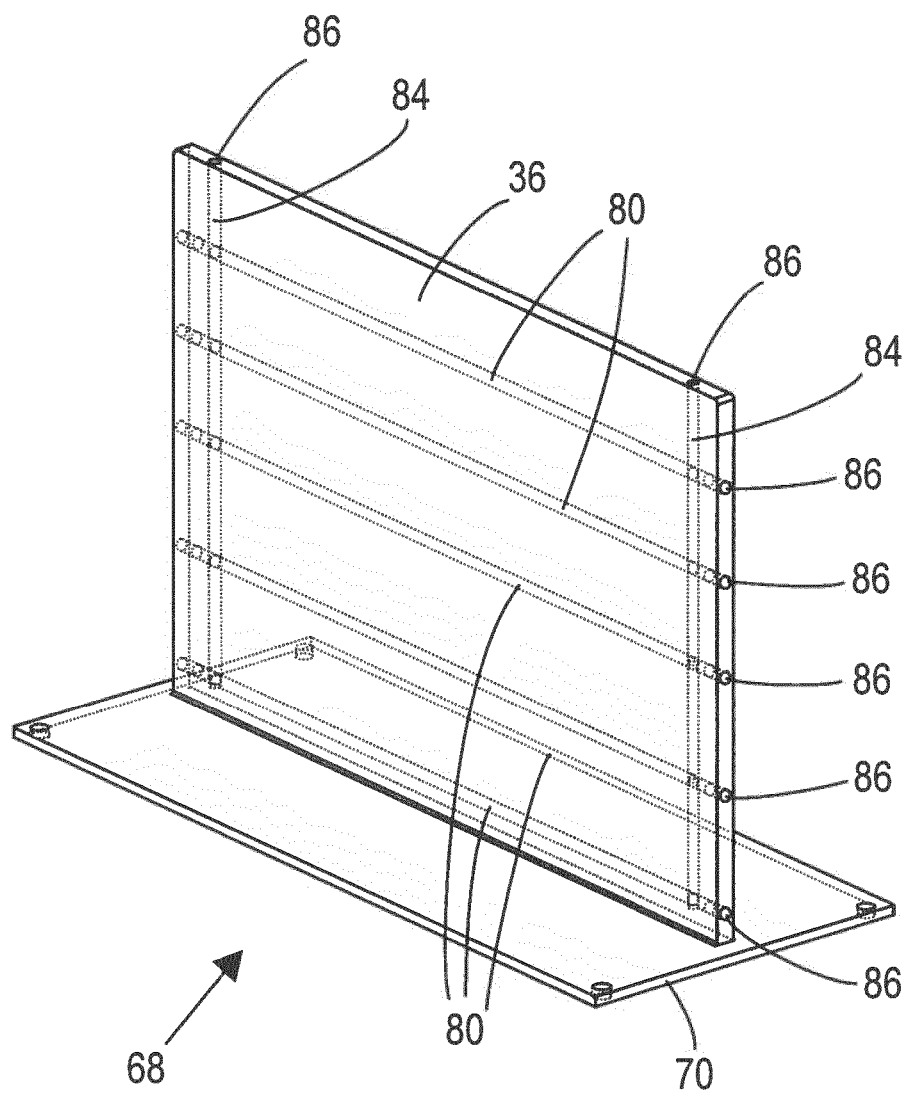
FIG. 3 a perspective part sectional view of a T shaped cooling member of the battery module of FIG. 2.

FIG. 3 shows a part sectional part schematic view in which the interplay between the cooling passages 80 and the transverse cooling passages 84 can be seen. As further indicated in FIG. 3, the spacing between the cooling passages 84 increases over a width of the cooling plate 36. This is done in order to manipulate the pressure of the coolant flowing through the respective cooling passage 84 such that approximately the same amount of coolant flows through each coolant passage 84 in order to ensure an as homogenous as possible cooling of the battery cells 16 of a battery unit 10 as possible.

Fastening means for connecting each of the battery units 10 to the T-shaped carrier 68 respectively the base plate 70 can also be provided in order to ensure a thermal contact between the cylindrical battery cells 16 and the cooling plate 36. The fastening means can be provided in the form of cooperating nuts and bolts (not shown) or in the form of e.g. a heat conductive glue material that holds the battery units 10 to the T-shaped carrier 68 (also not shown). Also other kinds of fastening means could be provided.

A plurality of battery modules 66 can also be arranged in a common housing to form a battery system (not shown). Such a battery system further comprises a cooling system connectable to each of the battery modules 66, i.e. the spouts 82 thereof for the provision of the liquid cooling, and a battery controller electrically connected to each of the battery management systems 78 of the battery modules 66 in order to manage the power output to an electric vehicle having the battery system and to manage the charging of the battery modules 66 respectively of the cylindrical battery cells. The battery controller can further be configured to manage a heating and/or cooling of the battery modules 66 of the battery system via the battery management system 78.

Figure 4:
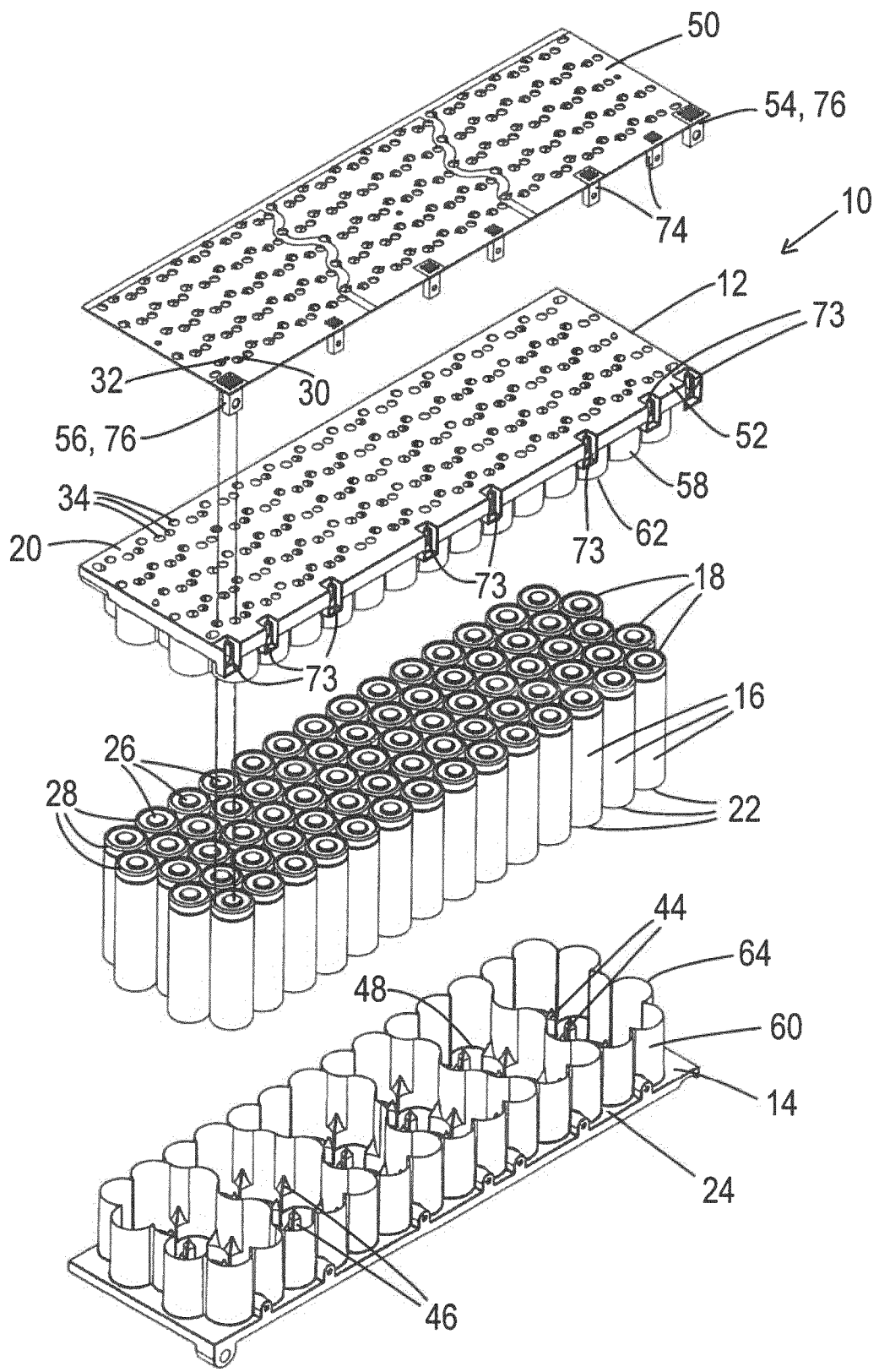
FIG. 4 a perspective view of a battery module sub-assembly for mounting on a T shaped carrier.

FIG. 4 shows a perspective view of a battery unit 10 used as a battery module 66 sub-assembly for mounting on the T shaped carrier 68. The battery unit 10 comprises six pairs of receptacles 12, 14 each defining a chamber for accommodating the plurality of cylindrical battery cells 16. The battery cells 16 arranged in each group are electrically connected together in parallel and the six groups are each connected together in series in the example of FIG. 4.

It is however possible to connect the individual groups in parallel with one another.

The wall members 58, 60 of the respective receptacles 12, 14 form electrical insulation between the respective groups. Each group of the example shown in FIG. 4 comprises 12 cylindrical battery cells 16. The battery cells 16 are spaced apart from one another in each chamber via the locating elements 44 to form the array of regularly spaced cylindrical battery cells 16.

The wall members 58, 60 are provided to ensure that the different parallel groups of battery cells 16 are isolated from one another to avoid short circuits.

Depending on the state of charge of the battery unit 10 shown in FIG. 4, the battery unit 10 will have an output voltage in the region of 16.2 V to 25.2 V. The output voltage of each group is made available via the conducting elements 74, 76.

To accommodate the conducting elements the first receptacle 12 comprises recesses 73 such that a construction space of the battery unit 10 can be minimized.

The invention will now be described in the following using the language of the inventors: Several aspects were considered for a novel module development based on cylindrical cells 16.

Cells 16 are grouped in parallel oriented entities, which are all inserted into a bottom plastic cell basket, i.e. the second receptacle 14. The bottom cell basket 14 is made from an electrically insulating, yet thermally conductive plastic (e.g. PA6 with metal oxide filler materials for enhanced thermal conductivity). Preferably, the cells 16 are glued in the bottom basket 14 with a thin layer of thermally conductive glue 48. Small studs 44 with wedges in between cells 16 are designed to support cell alignment and automated insertion. Where bare cell outer metal cans could get in contact and short circuit, thin walled plastic barriers (58,60) can be formed into the basket plastic (see FIG. 4).

A top plastic cell basket, i.e. the first receptacle 12, is then placed on the assembly, which resembles the mirrored bottom basket but provides multiple holes, i.e. the apertures 34, on the top side of each single cells 16. A multi-layer electrical connection layer, preferably in the form of a printed circuit board (PCB) 50, is laminated on top of the assembly and has the same hole pattern layout as the top cell basket. The top basket 14 and PCB like structure 50 are usually fixed to another by glue, clips, plastic welds or similar methods.

The holes in the top assembly provide access to the cell poles 26, 28. The positive cell pole 26 is usually in the middle of the cell 16, and the negative cell pole 28 can be accessed at the top edge 18 of the cell 16 (as the entire metallic cell can is usually connected to the negative pole 28). The cell voltage potentials are now electrically bonded to the PCB structure 50 on dedicated bonding areas. Bonding can be done by ultrasonic bond wires (Aluminum or Copper round or flat ribbon wires are possible), where the bond wire serves as a fuse in case of an overcurrent event. Other connection methods can be used if the amount of heat input into the thermally sensitive cell is limited. Such methods could be spot welding, laser soldering, laser welding, automated soldering iron soldering, press contact etc. It is possible to mix the methods, e.g. using bond wire 30 on the positive pole 26 and laser soldering on the negative pole 28.

The PCB copper traces are layout routed in at least two layers in such a way that the cells 16 can be grouped flexibly in parallel/serial configurations. E.g. the first 12 cells 16 could be electrically connected in parallel, and then this voltage could be fed to the negative poles 28 of the following cell group (which again consists of 12 parallel cells). Such a feature is easy and cost efficient to achieve in a PCB by the methodology of "vias" (electrically conductive drill holes), where current is fed from a top side conductor layer to a bottom side layer. Similar conductor structures could also be realized and mass produced by multiple bundled (but plastic cast isolated) conductor sheets, ("Stanzgittertechnik"), or similar bus bar structures as they are known from power electronics.

Plastic cover layers are placed (e.g. glued, clipped, screwed) on top of the bonded assembly, in order to protect the sensitive connection areas against mechanical damage, but also to protect against short circuits and ruggedise the module.

The entire interconnected cell carrying assembly is then glued to a thermal interface structure 36. Preferably, an inverted T shaped piece of Aluminium 68 (extrusion profile) can be used, where two of the basket/cell/PCB assemblies are glued from each side to the Ts center piece. The aluminum T serves as a mechanical support as well as an heat transfer element, where the heat from the cells is conducted through the cells to the cells bottom, through the thin bottom cell basket plastic layer, and downwards through to the baseplate of the inverted T. The inverted T in a final system configuration is placed (screwed) on a large coolant plate, preferably with a thin thermal interface contact layer ("GapPad") to improve the heat transfer from the T to the cooling plate. In this connection reference is made to WO 2017/041844 that discusses the assembly of a battery system comprising a plurality of battery modules. The battery system discussed in WO 2017/041844 is hereby incorporated by reference with respect to the assembly of the battery system. The thermal performance of the T shaped aluminum structure can be improved by e.g. using thicker aluminum profiles, better thermally conductive materials like copper, graphite, or heat pipes in combination with the aluminum profile.

On the top side of the inverted T profile, a further PCB structure 72 is mounted with electrical contact blocks carrying voltage and current from the two side cell PCBs upwards to the top PCB. This top PCB serves multiple functions: The two side PCBs are electrically connected in series or parallel; the end pole terminals of the module (e.g. module (+) on one side and module (−) on the other side) are carried to the outside world (e.g. screw terminals or connector terminals). Furthermore, the BMS monitoring functions can be placed here to measure cell group voltages, module voltages, cell group temperatures by indirect T sensors (PCB mounted), current by using PCB segments as a shunt, where the copper temperature coefficient can be corrected by local temperature sensors. More sensor and actor functions like terminal temperature sensor, cell balancing circuits, fuses, power switches and other typical BMS functions can be placed on this top side PCB 72. All of the BMS information can be transmitted to an external supervisory BMS by means of e.g. a CAN bus, ISO-SPI bus or other wired/wireless communication methods.

As an option, the inverted T extrusion aluminum profile 68 could be made to incorporate multiple small channels (formed during the extrusion) and a perpendicular drill hole or manifold structure with a coolant connection from the top side on both ends. This allows, when all unnecessary openings are closed by e.g. pre-coated sealing screws 88, to form a multi parallel channel liquid cooling plate 36 right in between the cell basket assemblies, and hence provides an efficient and affordable cooling method without the need for an external system level cooling plate. The flow distribution will be normally unequal, since most of the coolant flow will go through the channels that are closest to the manifold. This can be avoided by selective coolant flow hole diameter adjustments (smaller diameters act as an orifice to throttle the flow in channels that otherwise would get too much coolant). Corrugated coolant tube walls or turbulence inducing inserts could be used to improve heat transfer from the coolant to the aluminum extrusion profile 68. The middle section of the inverted T 68 can be made high in this approach as the heat does not have to travel a long way downward to an external cooling plate.

As a further option, the cell basket assembly could be used entirely without the inverted T extrusion profile and instead placed flat (with the cell bottom sides facing downwards) on a large cooling plate as discussed e.g. in WO 2017/041844. To improve mechanical robustness, an aluminum carrier base plate with mounting screws could be glued to the bottom side of the cell basket assembly before mounting the assembly to the cooling plate, which facilitates robust fixture to the cooling plate (via e.g. 4 corner screws and a gap pad material). This base plate could also be made from an extrusion process with fabricated coolant holes and a manifold structure, to make a separate cold plate obsolete.

In case of a cell thermal event, dedicated fire propagation mechanisms can be included into the design of the module, i.e. the flame retardant elements. For example, the bottom cell basket material should be thermally conductive. However, the top cell basket material could be thermally insulating or even made with typical flame retardant ash—building or flame extinguishing plastic additives or intumescent additives, which thermally isolates a single burning cell from its neighboring cells.

Electrical isolation could be breached on the mating line of the lower cell basket to the upper cell basket, as a gap is usually formed here. The required electrical creepage and clearance can be achieved by adequate spacing of external conductive structures, or by overlapping the upper and lower basket in the mating area.

LIST OF REFERENCE NUMERALS 10 battery unit
12 first receptacle
14 second receptacle
16 cylindrical battery cell
18 first end of 16
20 first end wall
22 second end of 16
24 second end wall
26 positive electrode
28 negative electrode
30 wire
32 wire
34 aperture
36 cooling plate
38 fastener element
40 aperture
42 aperture
44 locating elements
46 tapered wall elements
48 blob of adhesive
50 electric circuit board
52 outer side of 20
54 positive terminal
56 negative terminal
58 wall member of 12
60 wall member of 14
62 end of 58
64 end of 60
66 battery module
68 T-shaped carrier
70 base plate
72 further electric circuit board
73 recess
74 first conducting element
75 fastener elements
76 second conducting element
77 apertures
78 battery management system
80 coolant passage
82 spout
84 transverse coolant passage
86 opening
88 plug
90 stabilizing member
92 passage
94 aperture
96 nose
98 cut-out

The invention claimed is:

1. A battery module comprising:
two battery units arranged at a base plate, wherein each battery unit comprises one or more pairs of oppositely disposed receptacles, each said pair of receptacles defining a respective chamber for accommodating one or more cylindrical battery cells, each cylindrical battery cell having a first end adjacent a first end wall of a first one of said receptacles and a second end adjacent a second end wall of a second one of the pair of said receptacles, each cylindrical battery cell having positive and negative electrodes, with positive and negative bond wires being connected to said positive and negative electrodes at the first end of each battery cell and extending through apertures provided at said first end wall, said second end wall forming a thermal conduction path for dissipating heat,
a battery management system connected to the positive and negative bond wires of the cylindrical battery cells, and
fastening means for connecting said two battery units to the base plate, and
wherein the two battery units are provided at a T-shaped carrier, said T-shaped carrier being formed by said base plate and a cooling plate, the cooling plate extending from the base plate at right angles thereto, with the two battery units being provided on opposite sides of said cooling plate with the respective second end walls of each battery unit being positioned at respective faces of said cooling plate, and wherein said cooling plate comprises one or more coolant passages that are configured to conduct a coolant therethrough, wherein each coolant passage is associated with one or more rows of the cylindrical battery cells.

2. A battery system comprising:
a plurality of battery modules, wherein each of the plurality of battery modules comprises:
two battery units arranged at a base plate, wherein each battery unit comprises one or more pairs of oppositely disposed receptacles, each said pair of receptacles defining a respective chamber for accommodating one or more cylindrical battery cells, each cylindrical battery cell having a first end adjacent a first end wall of a first one of said receptacles and a second end adjacent a second end wall of a second one of the pair of said receptacles, each cylindrical battery cell having positive and negative electrodes, with positive and negative bond wires being connected to said positive and negative electrodes at the first end of each battery cell and extending through apertures provided at said first end wall, said second end wall forming a thermal conduction path for dissipating heat, a battery management system connected to the positive and negative bond wires of the cylindrical battery cells, and fastening means for connecting said two battery units to the base plate, and wherein the two battery units are provided at a T-shaped carrier, said T-shaped carrier being formed by said base plate and a cooling plate, the cooling plate extending from the base plate at right angles thereto, with the two battery units being provided on opposite sides of said cooling plate with the respective second end walls of each battery unit being positioned at respective faces of said cooling plate, and wherein said cooling plate comprises one or more coolant passages that are configured to conduct a coolant therethrough, wherein each coolant passage is associated with one or more rows of the cylindrical battery cells, a cooling system connectable to each of the battery modules, a battery controller electrically connected to each of the battery management systems of the battery modules, and a housing in which said plurality of battery modules are arranged.

3. The battery module in accordance with claim 1, wherein the battery management system is arranged at a further electric circuit board that extends at least substantially in parallel to the base plate between the respective circuit boards arranged at the first end walls of the two battery units and that is connected to said circuit boards arranged at the first end walls via conducting elements.

4. The battery module in accordance with claim 1, wherein each of the one or more cylindrical battery cells in each chamber are electrically connected together in parallel in a group of cylindrical battery cells.

5. The battery module in accordance with claim 4, wherein each group of cylindrical battery cells is connected to an adjacent group of cylindrical battery cells in series or in parallel, with the first end wall and the second end wall of the respective receptacles forming electrical insulation between the groups of cylindrical battery cells.

6. The battery module in accordance with claim 1, wherein each said chamber includes locating elements at at least one of said second end walls to form an array of regularly spaced cylindrical battery cells, wherein at least one of the locating elements has tapered wall elements forming introduction aids for inserting each of the cylindrical battery cells.

7. The battery module in accordance with claim 1, wherein the second end wall is formed of a material having a higher thermal conductivity than a material of the first end wall, and wherein the second end wall is either integrally formed with a second receptacle of said pair of receptacles, or the second end wall is at least partly formed separately or by means of a thermally conducting wall bonded to the second receptacle of said pair of receptacles.

8. The battery module in accordance with claim 1, wherein means is provided in at least one of each pair of receptacles for positioning each cylindrical battery cell in the respective chamber in a fixed orientation, wherein said means is located at at least one of said first end wall and said second end wall, wherein said means includes a blob of adhesive forming an adhesive bond to each said cylindrical battery cell.

9. A battery module in accordance with claim 1, wherein an end of the first one of each pair of receptacles remote from the first end wall is spaced in an axial direction of the cylindrical battery cells from an end of the second one of each pair of receptacles remote from the second end wall; and wherein the second one of each pair of receptacles has a reduced height in comparison to the first one of the pair of receptacles and in a first limiting case comprises only the second end wall having apertures therein and in a second limiting case is replaced by open ends of the first one of the receptacles.

10. The battery module in accordance with claim 1, further comprising thermally conductive and flame retardant feature elements, with the thermally conductive and flame retardant feature elements being disposed at at least one of the receptacles of each pair of receptacles and forming at least a part of said receptacle.

11. The battery module in accordance with claim 1, wherein the positive and negative bond wires are connected to an electric circuit board provided at an outer side of the first end wall of the pairs of receptacles; and wherein positive and negative potentials are made available at an electric circuit board provided at an outer side of the first end wall of the pairs of receptacles; and wherein the positive and negative potentials are connected to the battery management system, wherein the battery management system is configured to transport and distribute a current made available via the cylindrical battery cells, and to monitor a voltage, a current, and a temperature of at least one of the cylindrical battery cells.

12. The battery module in accordance with claim 1, wherein the cooling plate is arranged at the second end wall of the chamber and forms a part of the thermal conduction path for dissipating heat from the second ends of the cylindrical battery cells.

13. The battery module in accordance with claim 1, wherein stabilizing members are arranged at opposite ends of the T-shaped carrier.

* * * * *